Patented Mar. 7, 1950

2,500,131

UNITED STATES PATENT OFFICE 2,500,131

DI-N-OXIDES OF AMINO-SUBSTITUTED ACRIDINES AND QUINOLINES

Fred Linsker, New York, N. Y., assignor to Ralph L. Evans, Bay Shore, N. Y.

No Drawing. Application June 27, 1945, Serial No. 601,931

3 Claims. (Cl. 260—279)

This invention relates to N-oxides of heterocyclic nitrogen compounds with basic side chains and to processes for preparing said N-oxides.

Objects and advantages of the invention will be set forth in part hereinafter and in part will be obvious herefrom, or may be learned by practice with the invention, the same being realized and attained by means of the processes and compositions pointed out in the appended claims.

The invention consists in the novel processes and compositions herein shown and described.

An object of the present invention is to provide a new process for the formation of N-oxides of polyamino compounds having a basic nitrogen function in the heterocyclic nucleus and in a side chain. A further object is the provision of new compositions of matter in the form of such N-oxides.

Such N-oxides are effective pharmaceuticals, chemotherapeutic as well as symptomatic agents, and are superior to the bases from which they are derived as they are less toxic to the human organism.

Generally, in accordance with the present invention, the polyamino base is suspended in dilute hydrogen peroxide solution until the oxidation is completed. Evaporation, preferably under reduced pressure leaves the N-oxide as a residue, which may be converted to salts and other derivatives. These may also be obtained by reacting the oxide solution.

The following examples serve to illustrate specific embodiments of the invention:

*Example 1.*—10 grams of 2-methoxy-6-chloro-9-(1-methyl-4-diethylamino) butylamino acridine are suspended in 100 cc. 3% aqueous hydrogen peroxide solution for six days at 0° C. with frequent shaking. During this time the base gradually goes into solution, said solution having a yellow brown color. The solution is evaporated to dryness under 15 mm. pressure in a water bath kept below 40° C. The residue is 2-methoxy-6-chloro-9-(1-methyl-4-diethylamino) butylamino acridine-di-N-oxide. It has a crystalline structure and a melting point of 120° C. with decomposition. It is soluble in water, alcohol, acetone, and chloroform, and insoluble in ligroin.

The dihydrochloride of this compound is formed by dissolving the above residue in 200 cc. of water and adding 100 cc. 3 N-hydrochloric acid. The dihydrochloride is isolated as a yellow, microcrystalline precipitate in almost quantitative yield. It is recrystallized from dilute hydrochloric acid, appearing in the form of short yellow needles melting at 184°–186° C., with decomposition. This compound was confirmed by analysis:

$C_{23}H_{32}O_3N_3Cl_3$, M. W.=504.5

Calculated C: 54.7; H: 6.3; Cl: 21.1 found C: 54.3; H: 6.7; Cl: 21.0.

*Example 2.*—10 grams of 6-methoxy-8-(1-methyl-4-diethylamino) butylamino quinoline are suspended in 130 cc. 3% aqueous hydrogen peroxide solution and kept at 0° C. for several days until a clear brown solution forms. This solution is evaporated under reduced pressure in a water bath having a temperature below 40° C., leaving a viscous residue which is the di-N-oxide of 6-methoxy-8-(1-methyl-4-diethylamino) butylamino quinoline. This is soluble in water, and alcohol, less soluble in ether, and ethyl acetate, and is soluble in dilute mineral acids. The dihydrochloride is formed by evaporating the hydrochloric solution of the base under reduced pressure. This darkens at 75° C. and melts at 115°–120° C. with decomposition and foaming.

Salts of 6-methoxy-8-(1-methyl-4-diethylamino) butylamino quinoline-di-N-oxide have been formed as follows:

The picrate, by adding an alcoholic solution of picric acid to an alcoholic solution of the di-N-oxide. The resulting precipitate, the picrate, was recrystallized from alcohol and had a melting point range of from 65°–70° C.

The chloroplatinate, by adding a solution of chloroplatinic acid to a concentrated aqueous solution of the di-N-oxide dihydrochloride. The precipitate is recrystallized from ethyl alcohol, and melts at 185°–190° C.

The methylene disalicylate, by reacting disodium methylene-bis salicylate with the di-N-oxide dihydrochloride in concentrated aqueous solution. This salt melts from 53°–57° C.

The methylene bis-2-hydroxy-3-naphthoate by reacting the sodium salt of methylene bis-2-hydroxy-3-naphthoic acid with the di-N-oxide dihydrochloride in concentrated aqueous solution and purifying the resulting salt by precipitating it with water from its acetone solution. Small yellow prisms M. P. 278°–280° C. dec. This compound was confirmed by analysis:

$C_{42}H_{45}O_9N_3$ M. W.=735.5

Calculated C: 68.49; H: 6.18; found C: 68.71; H: 6.33.

Attention is hereby directed to the copending application of Evans and Linsker, Serial No. 590,511, filed April 26, 1945, in which N-oxides of heterocyclic organic nitrogen compounds are disclosed but in which the particular compounds disclosed and claimed in this application are not disclosed or claimed.

The invention in its broader aspects is not limited to the specific processes and compositions described but departures may be made therefrom within the scope of the accompanying claims without departing from the principles of the invention and without sacrificing its chief advantages.

What I claim is:

1. As a composition of matter a compound selected from the class consisting of 6-methoxy-8-(1-methyl-4-diethylamino) butylamino quinoline di - N - oxide; 2 - methoxy - 6 - chloro - 9 - (1-methyl-4-diethylamino) butylamino acridine-di-N-oxide; and their salts; in which compounds an oxide oxygen atom is linked to a tertiary nitrogen atom.

2. As a composition of matter, the compound 6-methoxy-8-(1-methyl - 4-diethylamino) butylamino quinoline-di-N-oxide, in which an oxide oxygen atom is linked to a tertiary nitrogen atom.

3. As a composition of matter, the compound 2-methoxy-6 - chloro - 9 - (1 - methyl - 4-diethylamino) butylamino acridine-di-N-oxide, in which an oxide oxygen atom is linked to a tertiary nitrogen atom.

FRED LINSKER.

REFERENCES CITED

The following references are of record in the file of this patent:

Meisenheimer, Berichte, 59, pp. 1843–1853, (1926).

Sidgwick, Organic Chemistry of Nitrogen (Oxford University Press, 1937), pp. 166–167.

Williams, Chemotherapy of Malaria (published by Lederle Laboratories, Inc., New York, 1941), pp. 96 and 205.

Fieser et al., Organic Chemistry, D. C. Heath & Co., Boston, 1944, pp. 240–241.

Bachman et al., J. Org. Chem., 9, pp. 302–309 (1944).